Lewis & Swenson,
Fire Escape.
No. 100,777. Patented Mar. 15, 1870.
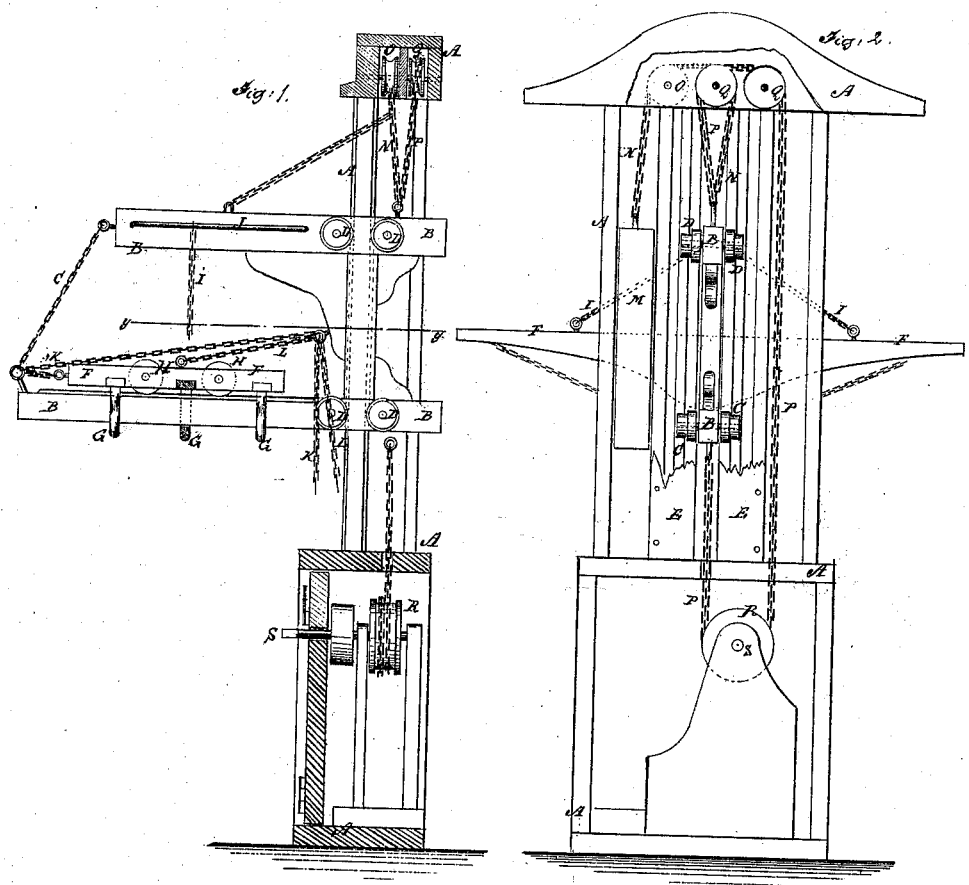
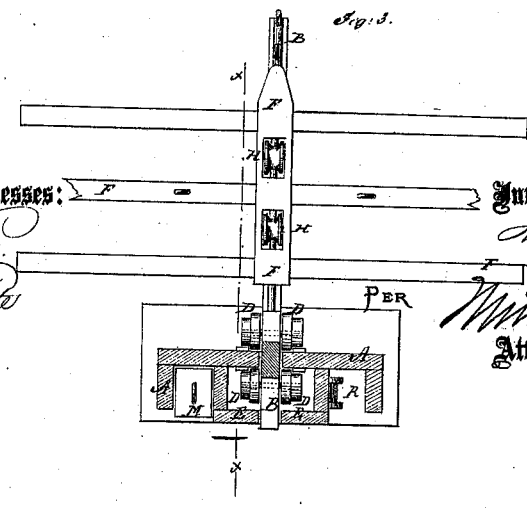
Witnesses:
Chas. Nida
Edgar Tate
Inventor:
M. Lewis
J. C. Swenson
Per
Attorneys.

United States Patent Office.

MICHEL LEWIS AND JOHN C. SWENSON, OF WILLIAMSBURG, NEW YORK.

Letters Patent No. 100,777, dated March 15, 1870.

---

IMPROVEMENT IN FIRE-ESCAPES.

---

The Schedule referred to in these Letters Patent and making part of the same

---

*To all whom it may concern:*

Be it known that we, MICHEL LEWIS and JOHN C. SWENSON, of Williamsburg, in the county of Kings, and State of New York, have invented a new and useful Improvement in Fire-Escape; and we do hereby declare that the following is a full, clear, and exact description thereof, which will enable others skilled in the art to make and use the same, reference being had to the accompanying drawings forming part of this specification, in which—

Figure 1 is a vertical longitudinal section of our improved fire-escape taken through the line *x x*, fig. 3.

Figure 2 is a rear view of the same, part being broken away to show the construction.

Figure 3 is a horizontal section of the same, taken through the line *y y*, fig. 1.

Our invention has for its object to furnish a simple, convenient, effective, and reliable fire-escape for permanent attachment to buildings, which shall be so constructed and arranged as not to interfere with the opening and closing of the blinds or shutters; and It consists in the construction and combination of the various parts of the fire-escape, as hereinafter more fully described.

A represents an iron frame-work, to be built into or securely attached to the walls of a house between two vertical rows of windows, so as not to interfere with the opening and closing of the window-blinds or shutters.

B are two parallel arms, placed one above the other, and the inner ends of which are rigidly and securely connected to each other, or formed solid in one piece.

The outer ends of the two arms B are connected to each other by a chain, C, so that the weight upon the lower arm may be partially supported by the upper arm.

The inner ends of the two arms B pass through a slot in the iron frame-work A, and have small wheels D pivoted to them, as shown in figs. 1, 2, and 3, which wheels, as the same arms move up and down, roll along the front and rear sides of said frame.

The lateral movements of the said arms B is guarded against by the plates E, attached to the rear side of the frame A, and the edges of which rest against the sides of the rear ends of the said arms, as shown in figs. 2 and 3.

F is the platform, which is placed upon the lower arm B, and which is connected to the said arm by keepers G, attached to the said platform, and through which the said arm passes.

To the middle part of the platform F are pivoted two or more grooved wheels H, which roll along the upper edge of the lower arm B, to enable the said platform to be drawn out from the wall of the house, or to be drawn in toward it, as may be required.

The platform F is kept from tipping laterally by the chains I, the lower ends of which are attached to the said platform, and their upper ends slide upon long staples J, attached to the upper arm B, as shown in fig. 1.

The platform F is drawn out from the building by the chain K, one end of which is attached to the center of the outer edge of the platform, and which passes through an eye-bolt or around a pulley attached to the outer end of the lower arm B.

The chain K passes through an eye-bolt or around a pulley attached to the connecting-bar of the arms B, and extends down along the wall of the building.

The platform F is drawn in toward the house by the chain L, the end of which is attached to the platform F, and passing through an eye-bolt or around a pulley attached to the connecting-bar of the arms B, it extends down along the wall of the building. The platform F is designed to be entirely encased within sheet-iron to protect those using it from the flames, and should have sliding doors upon the side next the building, which sliding doors should be connected with the in-draw chain L, so that the operation of drawing the platform F inward toward the building may also open the said doors, allowing people to step from the windows of the house directly upon the platform.

The weight of the platform F is balanced by a weight, M, attached to the end of the chain N, and which moves up and down in a recess in the rear side of the frame A.

The chain N passes over two pulleys O, pivoted to the upper part of the frame A, and its other end is attached to the upper arm B.

The platform F is raised and lowered by the chain P, one end of which is attached to the upper arm B, and which passes over two pulleys Q, pivoted to the upper part of the frame A.

The chain P passes down through a recess in the frame A, over a pulley, R, pivoted to a support in the lower part of said frame A, and its other end is attached to the lower arm B, so that by turning the shaft S, to which the pulley R is attached, in one or the other direction, the said platform may be raised and lowered, as may be desired.

The shaft S may be operated by a crank, or a wheel or pulley may be placed upon it, so that the platform F may be raised and lowered, as desired, by the power of the fire-engine.

Having thus described our invention,

We claim as new, and desire to secure by Letters Patent—

1. The platform F, in combination with the arms B, and so arranged that it may be drawn from and toward the building upon said arms, and raised and lowered with and by them, substantially as herein shown and described, and for the purposes set forth.

2. The combination of the in-draw chain L and out-draw chain K, with the platform F, arms B, and frame A, substantially as herein shown and described and for the purposes set forth.

3. The combination of the balance-weight M, chain N, hoist and lowering-chain P, pulley R, and shaft S, with the frame A, arms B, and platform F, substantially as herein shown and described and for the purposes set forth.

4. An improved fire-escape, formed by the combination of the iron frame A, arms B, platform F, out-draw and in-draw chains K L, chain N, balance-weight M, chain P, pulley R, and shaft S with each other, substantially as herein shown and described and for the purpose set forth.

The above specification of our invention signed by us this 19th day of January, 1870.

MICHEL LEWIS.
    JOHN C. SWENSON.

Witnesses:
 GEO. W. MABEE,
 JAMES T. GRAHAM.